No. 687,209. Patented Nov. 26, 1901.
P. DRINKAUS.
MITER CUTTING MACHINE.
(Application filed Jan. 25, 1901.)
(No Model.) 2 Sheets—Sheet 1.
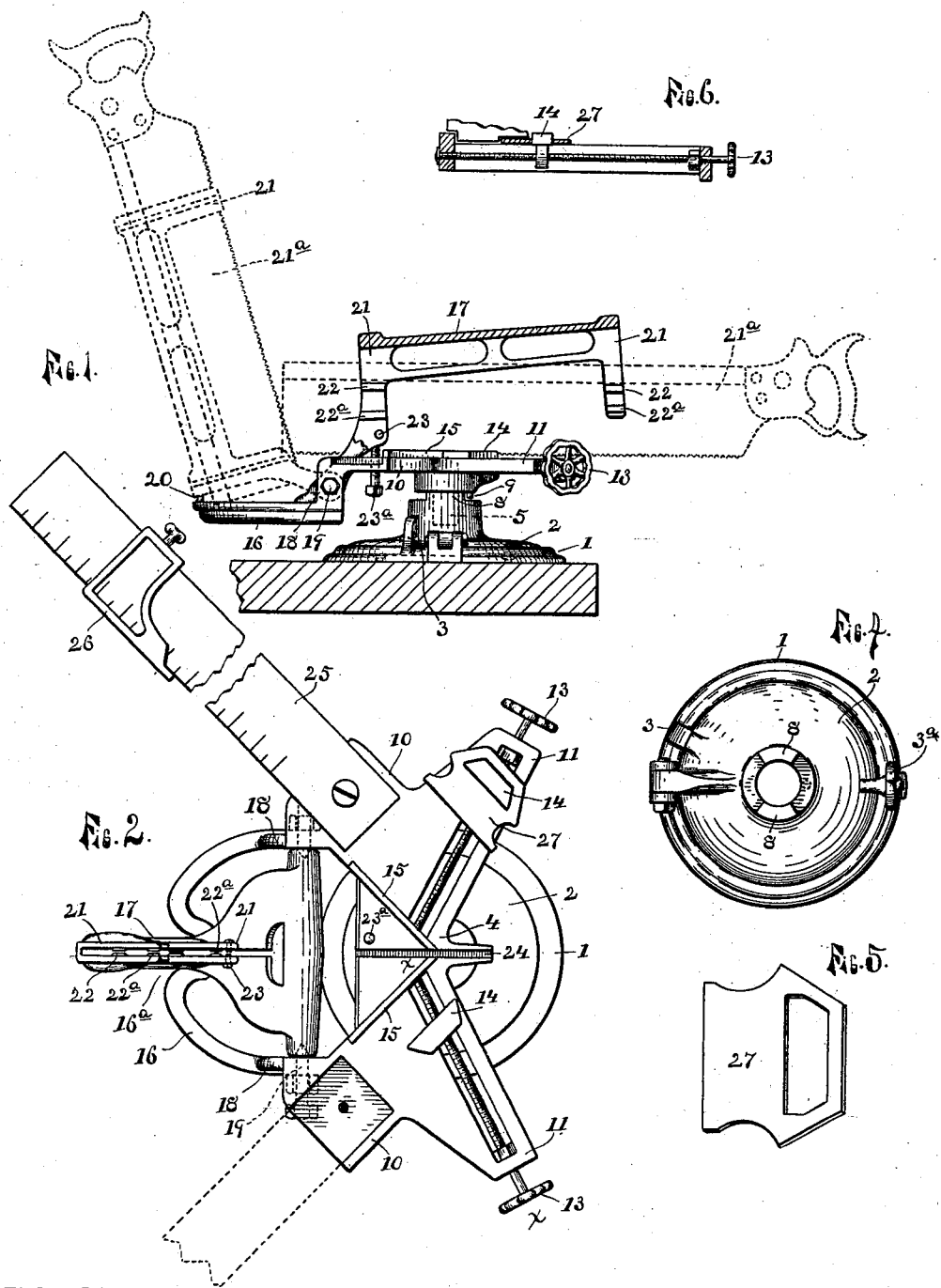

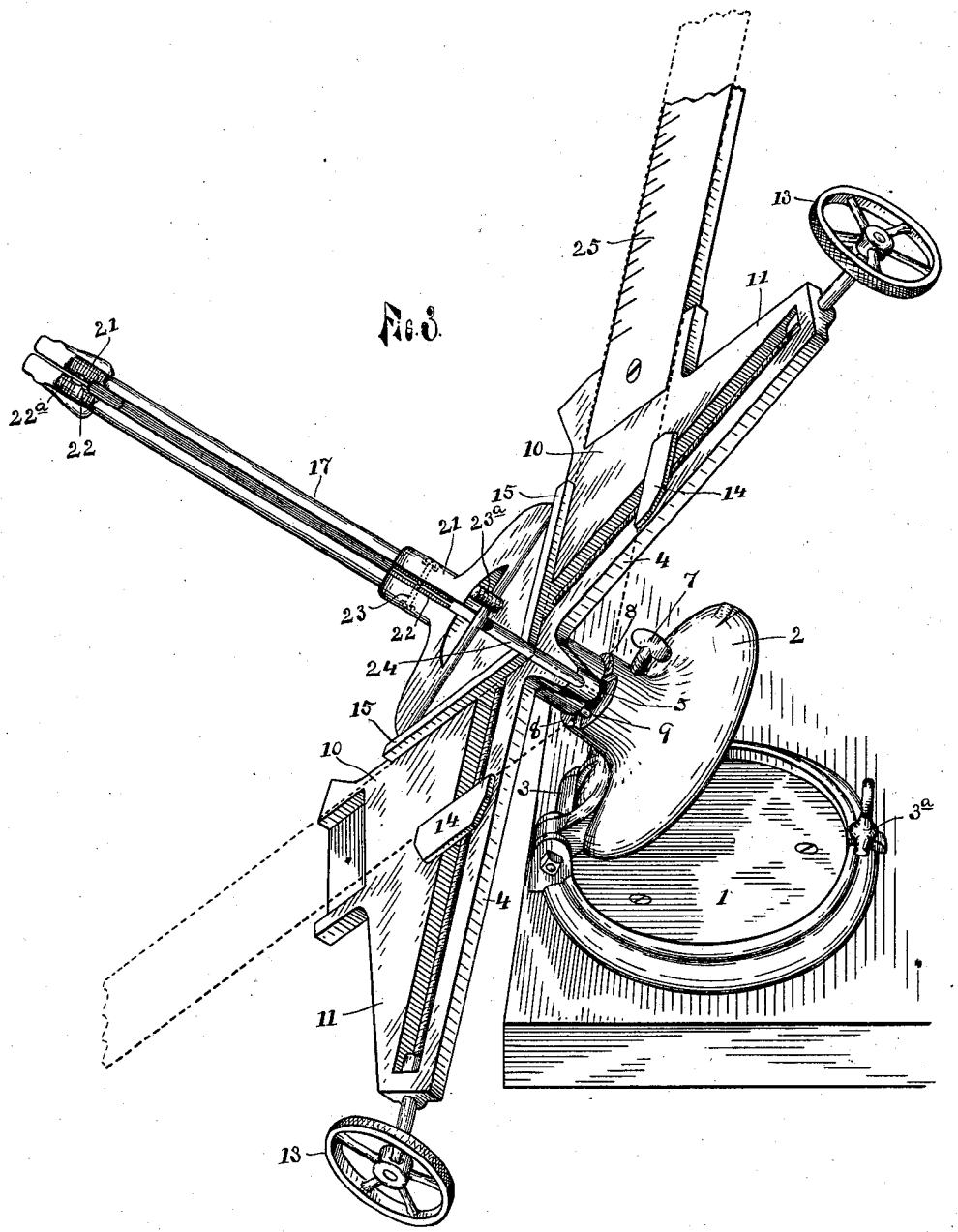

UNITED STATES PATENT OFFICE.

PHILLIPP DRINKAUS, OF DETROIT, MICHIGAN.

MITER-CUTTING MACHINE.

SPECIFICATION forming part of Letters Patent No. 687,209, dated November 26, 1901.

Application filed January 25, 1901. Serial No. 44,662. (No model.)

*To all whom it may concern:*

Be it known that I, PHILLIPP DRINKAUS, a citizen of the United States of America, residing at Detroit, in the county of Wayne and State of Michigan, have invented certain new and useful Improvements in Miter-Cutting Machines, of which the following is a specification, reference being had therein to the accompanying drawings.

The invention has particular reference to a mitering-machine particularly designed for the manufacture of picture-frames; and the invention consists in certain novel features of construction and in the combination of parts, all as hereinafter more fully described, and particularly pointed out in the specification and claims.

In the accompanying drawings, Figure 1 is a side elevation of the mitering-machine, partly in section, showing the saw and guide thrown back in dotted lines. Fig. 2 is a plan view thereof with the saw-guide thrown back. Fig. 3 is a perspective view showing the work-table and saw-guide thrown back as in the act of nailing the corners of the frame. Fig. 4 is a plan view of the base portion with the top removed. Fig. 5 is a plan view of one of the detachable clamping-plates. Fig. 6 is a section on line $x\ x$, Fig. 2, showing one of the detachable clamping-plates as in use with a molding having a deep undercut.

The standard or support consists of the base 1, secured to the top of the work-bench by means of screws, as shown, and having a hollow shank portion 2 hinged thereto at one side, a suitable stop 3 being provided to limit the movement of the hinged portion, and a locking-plate 3ª to hold the parts together when desired.

4 is the work-table, provided on its under side with a stub-shaft 5, adapted to be detachably secured in the hollow shank portion 2, free to turn therein by means of the thumb-screw 7, and 8 designates lugs formed on the upper edge of said shank portion, against which the stop-pin 9 is adapted to strike to limit the horizontal rotation of the work-table. I preferably have the upper edge of the hollow shank cut out on each side, as shown, so that the work-table may be reversed should occasion require it.

The work-table proper comprises the work-supporting arms 10 10 at right angles to each other, with their meeting ends to the front, and the arms 11 11 at an obtuse angle to each other and provided with the hand-screws 13, swiveled therein, carrying the clamping-jaws 14, adapted to engage the outer edge of a picture-frame molding and clamp the same against the shoulder or walls 15 of the arms 10. It will be seen that by making the arms 11 at an acute angle to the arms 10 it will have a slight tendency to force the meeting edges of the frame together while being clamped, thus insuring a perfect joint.

16 is a rearward extension of the work-table integrally formed therewith in a plane slightly below the same to form a stop for the saw and saw-guide when thrown back, and is provided with a cut-out portion 16ª to prevent the saw-teeth from striking the same when in use.

17 is a saw guide or frame provided with cone-bearings at right angles to the guide proper, said guide or frame being pivotally secured between the downwardly-extending portions 18 of the arms 10 by means of the conical adjusting-screws 19, so that all wear may be taken up and said guide or frame adjusted laterally over the work-table in perfect alinement therewith, said guide or frame being adapted to be thrown back against the stop 20, as indicated in dotted lines in Fig. 1.

21 represents guide-arms at front and rear of said frame, and 21ª is a straight-back or miter saw adapted to travel in said guide-arms free to have a limited vertical movement therein.

By reason of the saw-guide 17 being pivotally mounted in rear of the work-table the saw is given slightly more vertical play in the forward arm of the guide than in the rear to compensate for the difference in movement between the same, as shown in Fig. 1, the stops 22 being in the same horizontal plane, so that after the molding has been cut the saw will be in a horizontal position clear of the work-table and normally maintained in that position while sawing.

22ª represents additional stops to guide the saw-blade proper, and 23 represents adjustable stops adapted to steady the lower edge of the saw-blade where an extra wide blade is used.

23ª is a vertically-adjustable stop adapted to hold the saw-guide any desired distance above the work-table to permit the saw to cut through the molding and still not come in contact with the work-table, a groove 24 being provided, as shown, in the work-table.

25 is a suitable rule which may be attached to either one of the arms 10 and is provided with an adjustable gage-stop 26 for use in measuring the molding when a number of the pieces are to be cut of the same length, while 27 is a thin plate adapted to be slipped on over the clamping-jaws 14 when a molding with a deep undercut or lighter molding is being used.

It will be seen that my machine can be used on either the right or left hand end of the bench and that the work-table tips at right angles to the tilting of the saw-guide, which has not been done heretofore, and it will be noticed that both ends of the clamping-screws are swiveled in the work-table, as shown in Fig. 6, thus preventing the clamping-jaws from rising when in use.

Having thus fully described my invention, it is intended to operate as follows: The molding having been first cut to the desired length the saw and saw-guide are swung back out of the way and the molding clamped upon the work-table against the shoulders 15, with their miter-joints together by the action of the clamping-screws 13, which by reason of being arranged at an obtuse angle to each other tend through the medium of the clamping-jaws to crowd the abutting ends of the molding together, as will be readily seen from the drawings, thus insuring a perfect joint and at the same time leaving the greatest amount of room for free access to the miter-joint for nailing, which on account of the facility for nailing is preferably done with the work-table in the horizontal position, although, if desired, it can be turned upon its side, as shown in Fig. 3, and as the stop-pin 9 abuts against one of the lugs 8 a perfectly solid support is formed while nailing in the inclined position, thus leaving both ends free. The operation is thus repeated for each corner of the frame.

Having thus fully described my invention, what I desire to secure by Letters Patent is—

1. In a mitering-machine, the combination of a base, having a hollow shank or support hinged thereto at one side, a work-supporting table provided with a stub-shaft on its under side free to turn in said support, lugs formed on the upper end of said support, and a stop-pin carried by the work-table to limit the horizontal movement of the same, of a saw-guide having horizontal bearings in the supporting-table at right angles to the saw-guide whereby it may be swung away from said table, said saw-guide being constructed to receive a saw and permit it to reciprocate therein.

2. In a mitering-machine, the combination with a work-table having stationary jaws, of a base having a socketed support hinged thereto at one side free to tilt thereon, a stub-shaft carried by said work-table free to rotate in said socket, and stops to limit the horizontal rotation of the table, of a saw-guide carried by the table free to be thrown back at an angle thereto, a saw fitted to the guiding device and adapted to reciprocate therein, of opposing movable jaws coöperating with the stationary jaws and screws for operating the same, each movable jaw having a slight side motion toward each other to crowd the meeting ends of a frame together.

3. In a mitering-machine, the combination with a turn-table having stationary ledges or jaws at right angles to each other, a saw-guide pivoted in the table and a saw adapted to reciprocate therein, of a pair of opposing movable jaws parallel to the stationary jaws, and screws for independently operating the same, each movable jaw having a combined side and forward movement irrespective of the other jaw whereby the abutting ends of a picture-frame are crowded together as they are clamped between the jaws.

4. In a mitering-machine, the combination with a table having stationary jaws formed thereon, of a pair of movable jaws coöperating with the stationary jaws, and hand-screws arranged at an obtuse angle to each other for independently operating the movable jaws, whereby a combined side and forward movement is imparted to said jaws to crowd the abutting ends of a frame together.

5. In a mitering-machine, the combination with the base of a support hinged thereto at one side free to tilt thereon, a work-table pivotally mounted in said support, a pair of clamping-jaws carried by the work-table at right angles to each other and a saw-guide laterally adjustably mounted in bearings at right angles thereto, whereby said saw-guide may be swung in a vertical plane at an angle to the work-table and a stop carried by said work-table against which said guide is adapted to strike.

6. In a mitering-machine, the combination with the base of a socketed standard or support hinged thereto at one side free to tilt thereon, a work-supporting table pivotally mounted in said support, stops to limit the horizontal rotation of the table, a saw-guide at right angles to the work-table pivotally mounted in bearings carried by the table, and a stop whereby said saw-guide may be vertically adjusted in relation to the table.

7. In a mitering-machine, the combination with a turn-table having stationary jaws formed thereon, of a pair of movable jaws coöperating with the stationary jaws, and means for operating the movable jaws independently of each other, whereby a combined side and forward movement is imparted to said jaws to crowd the abutting ends of a frame together.

8. In a mitering-machine, the combination with the supporting-base, saw-guide and saw, of a work-table comprising the arms 10 at right angles to each other carrying the stationary members of the clamping-jaws, and the arms 11 at an obtuse angle to each other carrying the movable members of the clamping-jaws whereby the adjacent ends of a picture-frame molding are adapted to be clamped upon the work-table.

9. In a mitering-machine, the combination with a fixed base, of a supporting-standard hinged thereon and adapted to be tilted at an angle thereto, of a work-table having a limited rotary movement, carrying a pair of fixed and movable jaws at right angles to each other, and a saw-guide pivotally mounted at right angles to the work-table, adapted to maintain the saw in horizontal position while sawing, free to have a limited vertical movement therein.

10. In a mitering-machine, the combination with the base, of a support hinged thereto at one side free to tilt thereon, a work-table pivotally mounted in said support, a pair of clamping-jaws carried by the work-table at right angles to each other, a saw-guide pivotally mounted in bearings carried by the work-table, free to tilt thereon, and a rearward extension of the work-table against which said guide is adapted to rest when in its elevated position.

In testimony whereof I affix my signature in presence of two witnesses.

PHILLIPP DRINKAUS.

Witnesses:
OTTO F. BARTHEL,
JOSEPH A. NOELKE.